United States Patent [19]

Zeiringer et al.

[11] Patent Number: 5,603,738
[45] Date of Patent: Feb. 18, 1997

[54] PROCESS AND DEVICE FOR PREPARING AN ABRASIVE

[75] Inventors: Hans Zeiringer, Kappel am Krappfeld; Peter Janz, Klagenfurt, both of Germany

[73] Assignee: Treibacher Schleifmittel AG, Villach-Landskron, Austria

[21] Appl. No.: 339,081

[22] Filed: Nov. 14, 1994

[30] Foreign Application Priority Data

Nov. 15, 1993 [DE] Germany ........................... 43 39 031.5

[51] Int. Cl.⁶ ...................................................... C09C 1/08
[52] U.S. Cl. ................................ 51/293; 51/309; 501/127
[58] Field of Search ....................... 51/293, 309; 501/127

[56] References Cited

U.S. PATENT DOCUMENTS

| | | | |
|---|---|---|---|
| 4,035,162 | 7/1977 | Brothers et al. | 51/309 |
| 4,229,214 | 10/1980 | Shushlebin et al. | 51/309 |
| 4,341,533 | 7/1982 | Daire et al. | 51/309 |
| 4,405,545 | 9/1983 | Septier et al. | 264/144 |
| 5,023,212 | 6/1991 | Dubots et al. | 51/309 |
| 5,336,280 | 8/1994 | Dubots et al. | 51/293 |
| 5,340,781 | 8/1994 | Oda et al. | 501/127 |

*Primary Examiner*—Deborah Jones
*Attorney, Agent, or Firm*—John F. A. Earley; John F. A. Earley III

[57] ABSTRACT

The present invention pertains to a process for preparing an abrasive based on corundum with a grain shape factor exceeding 0.6.

10 Claims, 3 Drawing Sheets

PROCESS AND DEVICE FOR PREPARING AN ABRASIVE

The present invention pertains to a process and a device for preparing an abrasive based on corundum. Abrasives of this type have been known for a long time. They may be used as powders (grains) of varying fineness. Papers or linens coated with such powders are called flexible abrasives. Bodies, e.g., grinding wheels, which are used for the grinding processing of various materials, e.g., metals, wood or the like, may also be prepared from the grains.

Corundum has been known in various purities and compositions. So-called standard corundum contains 95 to 97 wt.% of $Al_2O_3$. Semiprecious corundum has an $Al_2O_3$ content of ca. 98% and is prepared, like standard corundum, mainly by reducing melting of calcined bauxites. Electrocorundums special fused alumina with even higher $Al_2O_3$ contents are, also available in various grades. These differ, e.g., due to additives, such as chromium oxide.

The special abrasives include zirconium corundums, which consist essentially of aluminum oxide and zirconium oxide.

A corundum, which occurs in the monocrystalline form, is used for preparing, e.g., grinding wheels for precision grinding. Such a monocrystalline corundum is characterized by good service life along with cool grinding behavior. However, its preparation requires a considerable technological expense.

Thus, the basic task of the present invention is to provide an abrasive based on corundum, which can be prepared in a relatively simple process and has a grinding behavior and a grinding performance that are comparable to those of monocrystalline corundum.

The present invention is based on the primary consideration that the grinding performance and the grinding behavior of an abrasive also strongly depend on the shape of the individual abrasive grain and the design and the sharpness of the cutting edges. An extensively cubic grain with distinct cutting edges leads to the best results.

In this sense, the term grain shape factor is defined such that a grain shape factor of 1 describes an ideally cubic abrasive grain. The ratio of the diagonals of an ellipse whose area is equal to the projection of the grain equals 1 (circle) in this case. Since this is a purely theoretical value, the present invention seeks to come as close as possible to the ideal value, and the individual grains of the abrasive should therefore have a grain shape factor greater than 0.6.

It was now surprisingly found that an abrasive based on corundum with a grain shape factor greater than 0.6 can be prepared in the following simple steps:

- an $Al_2O_3$-containing starting component with an $Al_2O_3$ content exceeding 98 wt. % is charged continuously or batchwise into a melting unit,
- the amount of the starting component charged in per unit of time and the furnace capacity are selected to be such that a melt sump formed in the melting unit will not exceed a maximum of 200 mm during the entire furnace campaign (until the removal of the solidified corundum ingot),
- the solidified corundum ingot is subsequently removed and reduced to the desired grain size. The essential object of the present invention is to control the melting process during the melting of the starting component such that the smallest (flattest) possible melt sump will be formed, or, in other words, the smallest possible amount of material will be in the molten phase during each phase of the melting process.

It will thus be possible to make available a plurality of free crystallization nuclei, which promote the formation of a macrostructure in the corundum ingot in the sense according to the present invention. The size of the individual crystals can be controlled, within certain limits, by the height of the melt bath (melt sump) and the size of the solidified melt ingot.

The process can be carried out particularly advantageously in an electric arc furnace. However, other melting units, such as plasma furnaces, are suitable as well. To increase the temperature gradient between the melt phase and the subjacent (solidified) corundum ingot, the process should be conducted such that the melting unit is cooled, e.g., with water, on the wall and/or bottom side.

The height of the melt sump can thus be reduced to a technological minimum. According to the present invention, the smaller the melt sump, the larger is the percentage of the abrasive grains with a grain shape factor close to 1.

The height of the melt sump is therefore limited to 100 mm according to one embodiment of the present invention, and to 50 mm according to another preferred embodiment.

The process according to the present invention can be carried out, in principle, with a conventional electric arc furnace. In this case, the process will specifically differ from a prior-art melting process in that the furnace is operated at reduced capacity and preferably with cooling of the furnace bottom, in order to minimize the height of the melt sump as much as possible.

By conducting the process according to the present invention, the macrostructure in the solidified corundum ingot is set such that nearly ideally cubic abrasive grains, whose cutting edges are chipped off only insignificantly at best, are obtained during the subsequent size reduction process with low grinding effort. The low grinding effort also guarantees increased yield of usable abrasive grains.

The use of a low-alkali aluminum oxide as the starting material leads to particularly favorable results, because the formation of $\beta$-$Al_2O_3$, a modification of little value in grinding technology, is extensively suppressed. The alkali content should be less than 0.1 wt. %.

In contrast, the results can be further optimized by such additives as oxides of groups 2–6 of the Periodic Table, especially $TiO_2$ and $Cr_2O_3$.

The size reduction may be performed in a known manner, e.g., by means of jaw crushers or roll-type crushers. Depending on how the process is conducted, crystals of various size are formed. For example, a grain 36 abrasive (FEPA standard) with a bulk density of 1.7 to 2.0 g/cm³ and a grain shape factor exceeding 0.7 can be prepared after the size reduction without any additional treatment of the grain shape.

The device for carrying out the process consists essentially of an electric arc furnace, which has a cooled bottom and/or wall area, as well as a protective plate on the bottom or in the wall area. As was described above, the cooling of the furnace bottom is to contribute to the increase in the temperature gradient between the melt and the solidified ingot. The protective plate is used as a safety means to separate the furnace bottom from the ingot (corundum ingot).

The cooling of the furnace sections may be performed with, e.g., water.

Other features of the present invention will become apparent from the features of the subclaims as well as the other application documents.

The present invention will be explained in greater detail below on the basis of an exemplary embodiment.

Five hundred kg of low-alkali α-aluminum oxide with an Na$_2$O content of 0.08 wt. % is provided as a starting component as a mixture with 1.5 kg of titanium dioxide and 0.75 kg of chromium oxide. The material is charged continuously into an electric arc furnace. A so-called Higgins furnace tank with a bottom cooled with water on the outside is used as the furnace vessel. To protect the cooled bottom, a graphite plate is arranged on the bottom, and coarsely crushed electro-corundum, which is to ensure the separation of the melt from the bottom during the initial melting of the starting component, is in turn placed on it [the graphite plate].

The amount of starting component charged in and the furnace capacity are selected to be such that the height of the melt sump (between the electrodes) does not exceed 100 mm at any point in time. Due to the improved heat dissipation, the height of the melt sump can be adjusted to lower values more easily at the beginning than near the end of the furnace campaign.

The furnace is switched off after the addition of the total amount of the charge. After even the last melt phase has solidified, the corundum ingot is removed from the furnace, crushed in jaw and roller-type crushers, and ground into grain 46 (FEPA standard) in a standardized manner.

The bulk density determined for the grains obtained according to the FEPA standard equals 1.82 g/cm$^3$, and the grain shape factor is 0.75. The composition of the abrasive grain is as follows (data in wt. %):

0.31% TiO$_2$, 0.15% Cr$_2$O$_3$, 0.08% Na$_2$O, remainder: Al$_2$O$_3$.

Ceramically bound grinding wheels with the dimensions of 225/25/50.8 mm were subsequently prepared from this material.

The wear of the wheel radius as a function of the feed (mm/stroke) is shown in the Diagrams 1, 2 and 3 below. The wheel speed is ca. 25 m/sec in all cases, and the table speed is ca. 20 m/minute. The results measured with a grinding wheel prepared with abrasive grains according to the present invention are shown as Example 2.

The reference sample pertains to a grinding wheel prepared with commercially available monocrystalline corundum grains of the grain size 46 (according to the FEPA standard). Example 1 shows the values measured on a grinding wheel prepared with grain 46 (according to the FEPA standard) obtained and processed according to the conventional preparation/melting technique of the same chemical composition as in Example 2.

Figure 1:
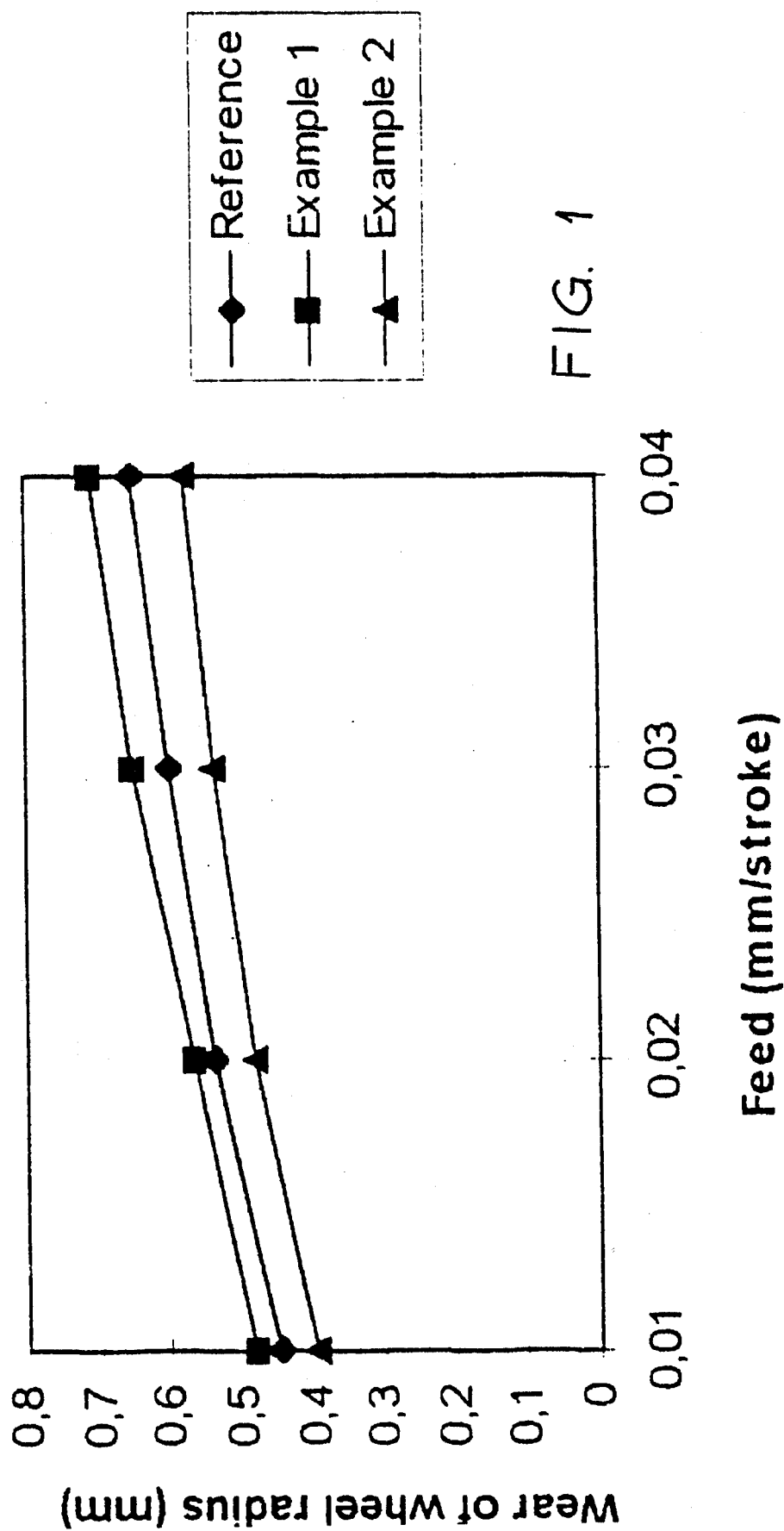
FIG. 1, diagram 1, shows the results of a grinding test performed with a coolant.
Figure 2:
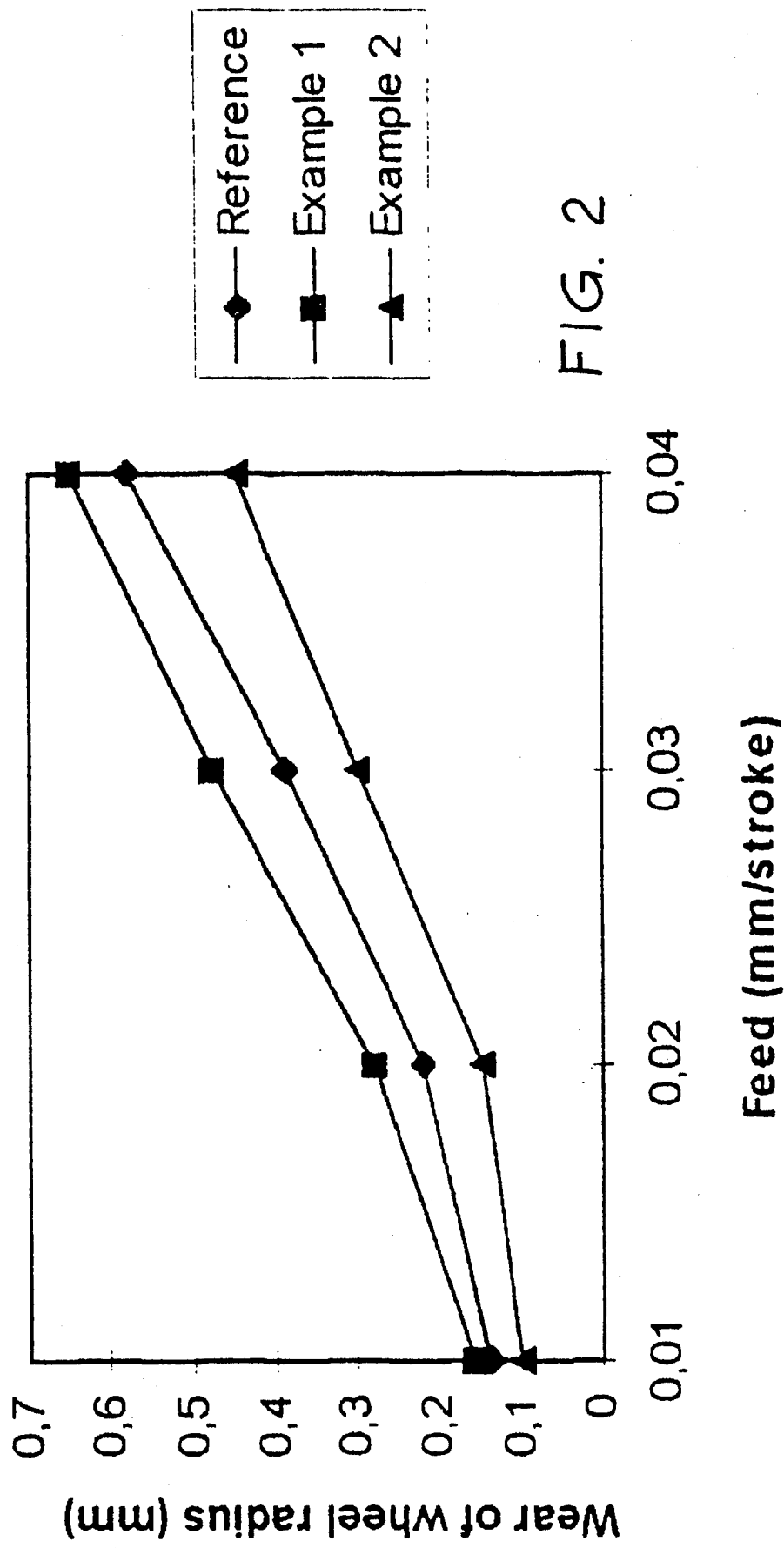
FIG. 2, diagram 2, shows the results of a grinding test performed without a coolant.
Figure 3:
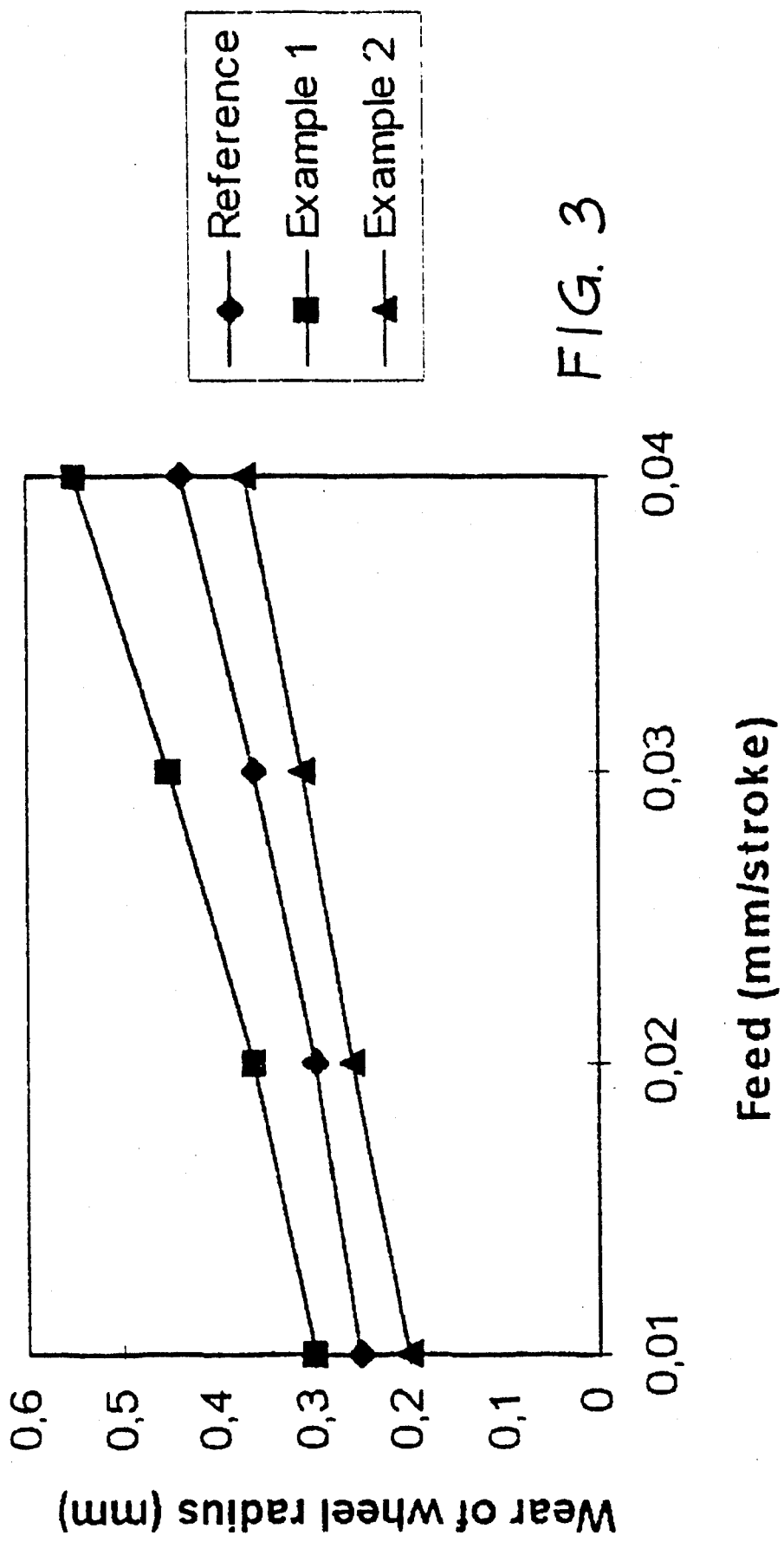
FIG. 3, diagram 3, shows the results of a grinding test performed with a coolant.

It can be clearly recognized that the abrasives according to the present invention always lead to markedly better grinding performance (reduced wheel wear), regardless of whether the grinding test is performed with coolant (Diagram 1) or without coolant (Diagram 2).

As is shown by a comparison of Diagrams 1 and 2 with Diagram 3, the advantages of the abrasive according to the present invention are also independent from the material to be ground. Steel grade S 6-5-2 (DM 05); 13343; HRC 64 was ground in the case of Diagrams 1 and 2, and a steel grade 90MnCrV8 was ground in the case of Diagram 3.

We claim:

1. Process for preparing an abrasive based on corundum, said process comprising the following steps:

1.1 an Al$_2$O$_3$-containing starting component with an Al$_2$O$_3$ content of >98 wt. % is charged continuously or batchwise into a melting unit in an amount per unit of time whereby a melt sump formed in the melting unit will never exceed a maximum height of 200 mm during the entire furnace campaign, 1.2 the melt sump is allowed to solidify to form a corundum ingot, 1.3 the corundum ingot is subsequently removed and sized to form an abrasive grain having a grain shape factor exceeding 0.6.

2. Process in accordance with claim 1, wherein that the melt sump will never exceed a height of 100 mm.

3. Process in accordance with claim 2, wherein the melt sump will never exceed a height of 50 mm.

4. Process in accordance with claim 1, provided that the Al$_2$O$_3$-containing starting component has an alkali content of less than 0.1 wt. %.

5. Process in accordance with claim 1, wherein the melting unit is an electric arc furnace.

6. Process in accordance with claim 1, wherein the melting unit is cooled on the wall and/or bottom side.

7. Process in accordance with claim 1, wherein a separating layer is placed on the bottom of the melting unit before the Al$_2$O$_3$-containing starting component is charged in for separating the melt from the bottom of the melting unit during initial melting of the Al$_2$O$_3$-containing starting component.

8. Process in accordance with claim 7, wherein the separating layer consists of coarse lumps of corundum.

9. Process in accordance with claim 1, in which the Al$_2$O$_3$-containing starting component contains up to 2.0 wt. % of additives selected from the oxides of groups 2–6 of the Periodic Table of Elements.

10. Process in accordance with claim 9 wherein said additives are TiO$_2$ and/or Cr$_2$O$_3$.

* * * * *